(12) United States Patent
van Vredendaal et al.

(10) Patent No.: US 12,445,303 B2
(45) Date of Patent: Oct. 14, 2025

(54) PROCESSOR TO ACCELERATE AND SECURE HASH-BASED SIGNATURE COMPUTATIONS

(71) Applicant: NXP B.V., Eindhoven (NL)

(72) Inventors: Christine van Vredendaal, Veldhoven (NL); Tobias Schneider, Graz (AT); Melissa Azouaoui, Norderstedt (DE)

(73) Assignee: NXP B.V., Eindhoven (NL)

( * ) Notice: Subject to any disclaimer, the term of this patent is extended or adjusted under 35 U.S.C. 154(b) by 201 days.

(21) Appl. No.: 18/337,795

(22) Filed: Jun. 20, 2023

(65) Prior Publication Data
US 2024/0430099 A1    Dec. 26, 2024

(51) Int. Cl.
*H04L 9/32*    (2006.01)
*H04L 9/08*    (2006.01)

(52) U.S. Cl.
CPC .......... *H04L 9/3247* (2013.01); *H04L 9/0869* (2013.01); *H04L 9/3236* (2013.01)

(58) Field of Classification Search
CPC ..... G06F 21/70; H04L 9/0869; H04L 9/3236; H04L 9/0643; H04L 9/0866; H04L 9/3278
See application file for complete search history.

(56) References Cited

U.S. PATENT DOCUMENTS

| | | | |
|---|---|---|---|
| 11,405,213 B2 | 8/2022 | Ghosh | |
| 11,456,877 B2 | 9/2022 | Mathew | |
| 2007/0183593 A1* | 8/2007 | Yoshida | H04L 9/0662 380/28 |
| 2014/0245384 A1* | 8/2014 | Shieh | H04L 9/0894 726/2 |
| 2022/0006653 A1* | 1/2022 | Ghetie | H04L 63/0428 |
| 2023/0334149 A1* | 10/2023 | Nashimoto | G06F 21/79 |

FOREIGN PATENT DOCUMENTS

| CN | 113225185 B | 5/2022 |
|---|---|---|
| EP | 4033696 A1 | 7/2022 |

OTHER PUBLICATIONS

Johannes Buchmann, Erik Dahmen, and Michael Schneider, Merkle tree traversal revisited, in Proceedings of the 2nd International Workshop on Post-Quantum Cryptography, PQCrypto '08, Springer-Verlag, 2008,pp. 63-78.

Yuan Cao, Yanze Wu, Wen Wang, Xu Lu, Shuai Chen, Jing Ye, and Chip-Hong Chang, An efficient full hardware implementation of extended merkle signature scheme, IEEE Transactions on Circuits and Systems I: Regular Papers 69 (2022), No. 2, 682-693.

(Continued)

*Primary Examiner* — Matthew T Henning

(57) ABSTRACT

A secure processing system configured to produce a hash based digital signature of a message, including: random number generator (RNG); a monotonic counter device configured to produce a monotonically increasing counter value; a hash accelerator configured to produce a hash of the message based upon a random number from the RNG and the counter value; and a run time integrity check (RTIC) device configured to check the integrity of the operation of the hash accelerator based upon the counter value.

22 Claims, 7 Drawing Sheets

(56) References Cited

OTHER PUBLICATIONS

Laurent Castelnovi, Ange Martinelli, and Thomas Prest, Grafting trees: A fault attack against the Sphincs framework, Post-Quantum Cryptography—9th International Conference, PQCrypto 2018, Fort Lauderdale, FL, USA, Apr. 9-11, 2018, Proceedings (Tanja Lange and Rainer Steinwandt, eds.), Lecture Notes in Computer Science, vol. 10786, Springer, 2018, pp. 165-184.

Andreas Hulsing, W-OTS+—Shorter Signatures for Hash-Based Signature Schemes, Progress in Cryptology—Africacrypt 2013 (Amr Youssef, Abderrahmane Nitaj, and Aboul-Ella Hassanien, eds.), vol. 7918, 2013, pp. 173-188.

Andreas Hulsing, Joost Rijneveld, and Fang Song, Mitigating Multi-target Attacks in Hash-Based Signatures, PKC 2016 (Chen-Mou Cheng, Kai-Min Chung, Guiseppe Persiano, and Bo-Yin Yang, eds.), vol. 9614, 2016, pp. 387-416.

Markus Jakobsson, Tom Leighton, Silvio Micali, and Michael Szydlo, Fractal merkle tree representation and traversal, In Proc. of RSA Cryptographers' Track, Springer, 2003, pp. 314-326.

Mehran Mozaffari Kermani, Reza Azarderakhsh, and Anita Aghaie, Fault detection architectures for post-quantum cryptographic stateless hash-based secure signatures benchmarked on ASIC, ACM Trans. Embed. Comput. Syst. 16 (2017), No. 2, 59:1-59:19.

Marcel Medwed, Ftan~ois-Xavier Standaert, Ventzislav Nikov, and Martin Feldhofer, Unknown-input attacks in the parallel setting: Improving the security of the CHES 2012 leakage-resilient PRF, Asiacrypt (1), Lecture Notes in Computer Science, vol. 10031, 2016, pp. 602-623.

Ralph C. Merkle, A Certified Digital Signature, Advances in Cryptology—Crypto (Gilles Brassard, ed.), vol. 435, Springer, 1989, pp. 218-238.

Cooper, David A. et al; "Recommendation for Stateful Hash-Based Signature Scheme"; NIST Special Publication 800-208; 59 pages; Oct. 2020; https://doi.org/10.6028/NIST.SP.800-208.

Genét, Aymeric et al; "Practical Fault Injection Attacks on Sphincs"; IACR Cryptology ePrint Archive 2018; 18 pages; p. 674; https://eprint.iacr.org/2018/674 Apr. 8, 2025.

Huelsing, Andreas et al; "XMSS: extended Merkle Signature Scheme"; Internet Research Task Force (IRTF); 74 pages; Request for Comments: 8391; May 2018; https://datatracker.ietf.org/doc/html/rfc8391.

McGrew, David et al; "Leighton-Micali Hash-Based Signatures"; Internet Research Task Force (IRTF), Request for Comments: 8554; Published Apr. 1, 2019; 61 Pages; DOI:https://doi.org/10.17487/RFC8554.

Thoma, Jan Philipp et al; "A Configurable Hardware Implementation of XMSS*"; IACR Cryptology ePrint Archive; Publication Date Mar. 18, 2021; Paper 2021/352; 14 pages; https://ia.cr/2021/352; https://eprint.iacr.org/2021/352.

Thoma, Jan Philipp et al; "Agile Acceleration of Stateful Hash-Based Signatures in Hardware"; ACM Transactions on Embedded Computing Systems; vol. 23, Iss. 2, Article No. 29; pp. 1-29; Published Mar. 27, 2024; https://doi.org/10.1145/3567426.

Wang, Wen et al; "XMSS and Embedded Systems XMSS Hardware Accelerators for RISC-V"; Selected Areas in Cryptography—SAC 2019; 26th International Conference, Waterloo, Ontario, Canada, Aug. 12-16, 2019, Revised Selected Papers; pp. 523-550; Published Aug. 12, 2019; https://doi.org/10.1007/978-3-030-38471-5_21.

\* cited by examiner

PROCESSOR TO ACCELERATE AND SECURE HASH-BASED SIGNATURE COMPUTATIONS

FIELD OF THE DISCLOSURE

Various exemplary embodiments disclosed herein relate to processors to accelerate and secure hash-based signature computations.

BACKGROUND

Digital signatures are of vital importance to the cryptographic infrastructure. For example, digital signatures underpin the authentication infrastructure in the form of digital certificates on the internet, which is shifting more and more to resource-constrained devices on the Internet of Things (IoT). In order to make digital signatures accessible to such small devices, it is important to minimize the resource requirements and optimize the efficiency of the involved algorithms (e.g., key generation, signature generation and verification).

SUMMARY

A summary of various exemplary embodiments is presented below.

Various embodiments relate to a secure processing system configured to perform a hash based digital signature of a message, including: random number generator (RNG); a monotonic counter device configured to produce a monotonically increasing counter value; a hash accelerator configured to produce a hash of the message based upon a random number from the RNG and the counter value; and a run time integrity check (RTIC) device configured to check an integrity of an operation of the hash accelerator based upon the counter value.

Various embodiments are described, wherein the RNG is a pseudo-random RNG.

Various embodiments are described, wherein the RNG is a leakage resistant pseudo-random RNG.

Various embodiments are described, further including a security monitor configured to monitor the secure processing system based upon outputs from the RTIC device.

Various embodiments are described, further including a secure non-volatile memory (NVM) configured to store a private seed.

Various embodiments are described, further including a physical unclonable function (PUF) configured to produce the private seed that is unique to the secure processing system.

Various embodiments are described, wherein the NVM stores auxiliary data used to compute an authentication path.

Various embodiments are described, wherein the NVM stores a hash of auxiliary data used to verify the integrity of an authentication path.

Various embodiments are described, wherein the NVM stores a hash of auxiliary data used to verify the integrity of an authentication path and the counter value.

Various embodiments are described, wherein the RTIC device is configured to store auxiliary data used to compute an authentication path in an external memory, store a hash of the auxiliary data in the NVM, retrieve the auxiliary data from the external memory, hash the auxiliary data from the external memory, and compare the hash of the auxiliary data from the external memory to the hash of the auxiliary data stored in the NVM.

Various embodiments are described, wherein the hash accelerator is configured to maintain a hash counter value and the RTIC is configured to check the integrity of an operation of the hash accelerator based upon the hash counter value.

Various embodiments are described, wherein the hash accelerator is configured to receive a random mask and to apply the random mask to public input values to the hash accelerator.

Various embodiments are described, wherein the hash accelerator is configured to receive an enable signal indicating whether the random mask is to be applied to the public input values to the hash accelerator.

Various embodiments are described, wherein the monotonic counter device is configured to update the counter value each time the counter value is read from the monotonic counter device.

Further various embodiments relate to a method for producing a hash based digital signature using a secure processing system, including: receiving a signature request for a message; loading a secret seed from a non-volatile memory (NVM) into a secure random access memory (RAM); loading a monotonic counter state in the secure RAM; retrieving auxiliary data used to compute an authentication path from an external memory; verifying an authenticity of the auxiliary data; deriving a secret key based upon the secret seed and the monotonic counter state; generating a digital signature of the message using a hash accelerator based on the auxiliary data and the monotonic counter state; updating the auxiliary data for a next signature; and outputting the digital signature when the auxiliary data is authenticated.

Various embodiments are described, wherein the secret seed is produced by a physical unclonable function (PUF).

Various embodiments are described, wherein loading a monotonic counter state in the secure RAM includes retrieving the monotonic counter state from the NVM and comparing the monotonic counter state from the NVM with the monotonic counter state from a monotonic counter device and wherein the digital signature is output when the monotonic counter states match.

Various embodiments are described, wherein verifying an authenticity of the auxiliary data includes hashing the auxiliary data received from the external memory, and comparing the hash of the auxiliary data received from the external memory to a hash of the auxiliary data stored in the NVM.

Various embodiments are described, wherein deriving a secret key uses a blinding mask on public input values used in deriving the secret key.

Various embodiments are described, wherein generating the digital signature includes tracking a number of hashes performed.

Various embodiments are described, further including hashing the updated auxiliary data for a next signature and storing it in the NVM.

Various embodiments are described, further including storing a current monotonic counter state in the NVM.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
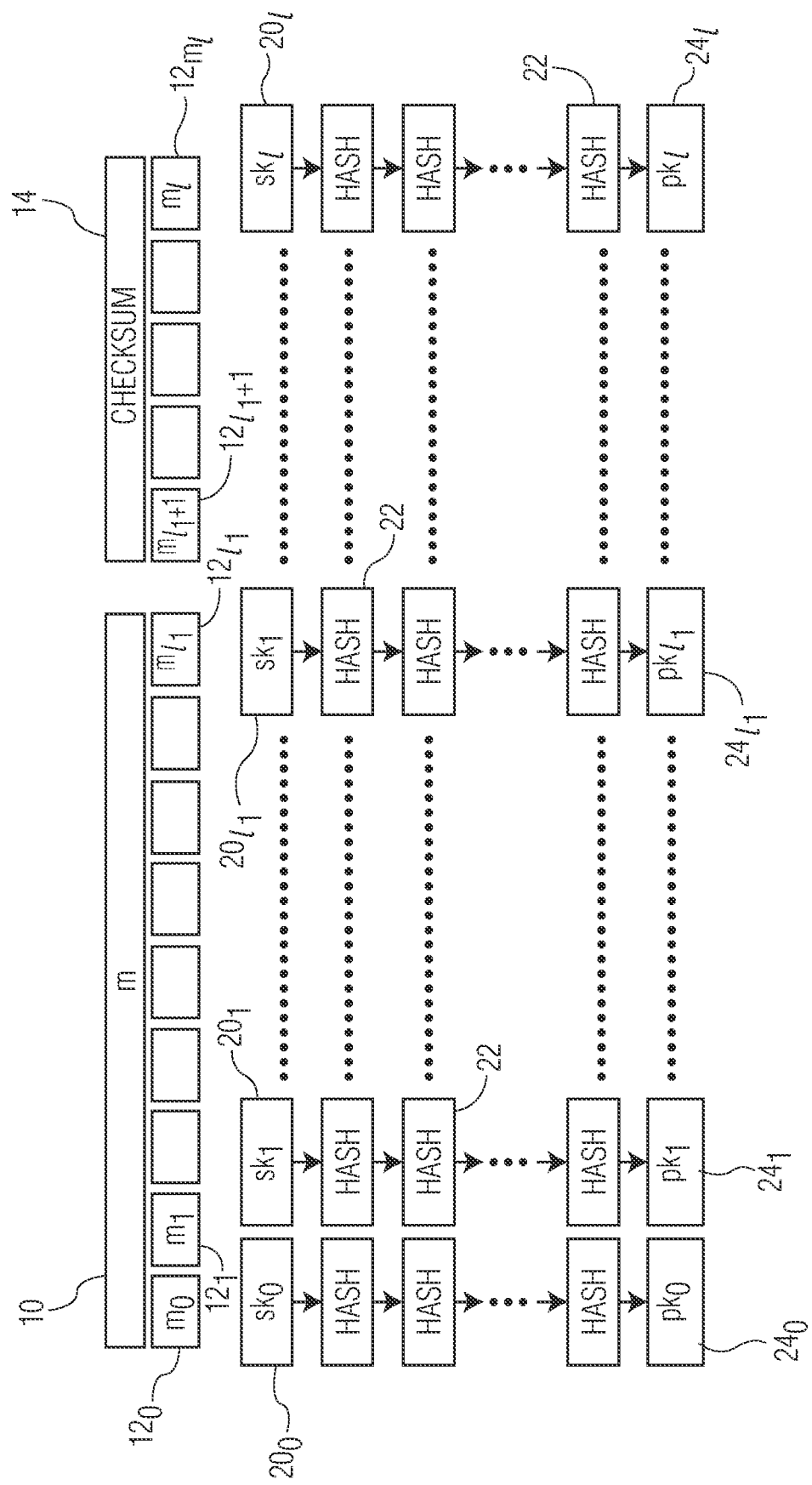
FIG. 1 illustrates the WOTS+ secret key and public key and how they are linked to the message digest and checksum.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of cryptographic systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

Digital signatures are of vital importance to the cryptographic infrastructure. New standards related to two quantum-safe digital signature schemes eXtended Merkle Signature Scheme (XMSS) and Leighton-Micali Signature (LMS) have been published. These stateful hash-based schemes have in common that the secret key includes a seed, from which the signature-specific secret keys have to be derived. As this key derivation processes secret information, this key derivation process may be targeted by a side-channel attacker and might require dedicated protection measures. Although recommendations for derivation strategies exist (mostly focused on performance impact, rather than side-channel security), there is no standard method to perform this key derivation. In this disclosure, a new key derivation method is described that enables a trade-off between side-channel security of the key derivation and the performance of the signing operation. This helps to improve the efficiency of hardened implementations of such digital signature schemes.

The most commonly used signature schemes are Rivest-Shamir-Adleman (RSA) and variants of Elliptic Curve Digital Signature Algorithm (ECDSA) and Digital Signature Algorithm (DSA). However, with the possibility of a quantum computer being realized, the security of RSA, ECDSA, and DSA is threatened. The idea of hash-based signatures dates back to a proposal by Ralph Merkle (see Ralph C. Merkle, *A Certified Digital Signature*, Advances in Cryptology—CRYPTO (Gilles Brassard, ed.), vol. 435, Springer, 1989, pp. 218-238) from the late 70s. Hash-based signatures rely on a graph structure in which nodes correspond to public keys of One-Time Signature (OTS) schemes, which are in turn constructed using hash functions. The security of this approach therefore relies on the cryptographic strength of the used hash function and the pseudo-random function family: cryptographic primitives which are well-studied, understood, and not known to be broken by quantum computers.

XMSS has matured since its original publication (see Johannes Buchmann, Erik Dahmen, and Andreas Hülsing. XMSS—A Practical Forward Secure Signature Scheme Based on Minimal Security Assumptions. In BoYin Yang, editor, Post-Quantum Cryptography, volume 7071 of LNCS, pages 117-129. Springer, 2011), resulting in the scheme described in RFC 8391 (see Andreas Hülsing, Denise Butin, Stefan-Lukas Gazdag, Joost Rijneveld, and Aziz Mohaisen, XMSS: *Extended Hash-Based Signatures*. RFC 8391, 2018). RFC 3291 uses WOTS+ as OTS, which are described herein in the context of XMSS (see Andreas Hülsing, W-OTS+—*Shorter Signatures for Hash-Based Signature Schemes*, Progress in Cryptology—AFRICACRYPT 2013 (Amr Youssef, Abderrahmane Nitaj, and Aboul-Ella Hassanien, eds.), vol. 7918, 2013, pp. 173-188). The security parameter n determines the message digest length m, and n influences the size of private key, public key, and signature. The Winternitz parameter w may be used to control a trade-off between speed and signature size. A greater value of w implies a smaller signature, but slower speeds and vice versa. Typically w is chosen as a power of 2 within {4,16, 256}, as this allows for easy transformation of bit strings into base-w encoded strings. Further define:

$$\ell_1 = \lceil m \frac{\log(w)}{2} \rceil, \ell_2 = \lfloor \frac{\log(\ell_1(w-1))}{2} \frac{\log(w)}{2} \rfloor + 1 \text{ and } \ell = \ell_1 + \ell_2.$$

An uncompressed WOTS+ private key, public key, and signature includes $\ell$ blocks of n bits each. FIG. 1 illustrates the WOTS+ secret key and public key and how they are linked to the message digest and checksum. The message M is digested to produce an m-bit message digest 10. The message digest 10 is split into $\ell_1$ blocks $m_0 \ldots m_{\ell_1}$ $12_0 \ldots 12_{\ell_1}$. A checksum 14 is performed on the message digest 10. The checksum 14 is split into $\ell - \ell_1$ blocks $m_{\ell_1+1} \ldots m_\ell$ $12_{\ell_1+1} \ldots 12_\ell$. The secret key sk includes $\ell$ blocks $sk_0 \ldots sk_\ell$ $20_0 \ldots 20_\ell$. Each of the $\ell$ blocks $sk_0 \ldots sk_\ell$ $20_0 \ldots 20_\ell$ are hashed 22 to produce secret key pk with $\ell$ blocks $pk_0 \ldots pk_\ell$ $24_0 \ldots 24_\ell$.

An m-bit message digest of a message M, $H_M$ may be re-written to its base-w representation. The result is a length $\ell_1$ vector of integers $h_i \in [0, w-1]$. Each of these integers defines a chain length in the message (hash) chains (i.e., $m_0$ to $m_{\ell_1}$ in FIG. 1). The checksum of $H_M$ is defined as $$C_M = \sum_{i=1}^{\ell_1}(w - 1 - h_i),$$

which can be represented as a length $\ell_2$ vector of base-w values $C_M=(c_1, \ldots, c_{\ell_2})$, with $c_i \in [0, w-1]$ (i.e., $m_{\ell_1+1}$ to $m_\ell$ in FIG. 1). These hash chains are called the checksum (hash) chains. This checksum is necessary to prevent message forgery: an increase in at least one $h_i$ leads to a decrease in at least one $c_i$ and vice-versa. Using these $\ell$ integers as chain lengths, the function $\mathcal{H}$ is applied to the private key elements. This leads to $\ell$ n-byte values that make up the signature. For a received message and signature, the verifier may recompute the checksum, derive the chain lengths, apply H iteratively to complete each chain to its full length w, and compute a candidate WOTS+ public key. This can then be compared to the n-byte public key.

Because a WOTS+ signature may only be used once, XMSS combines WOTS+ key pairs into a Merkle tree structure. A Merkle tree is a binary-tree-graph structure in which leaf-nodes (the lowermost layer) correspond to public keys of WOTS+, which are in turn constructed using hash functions.

Figure 2:
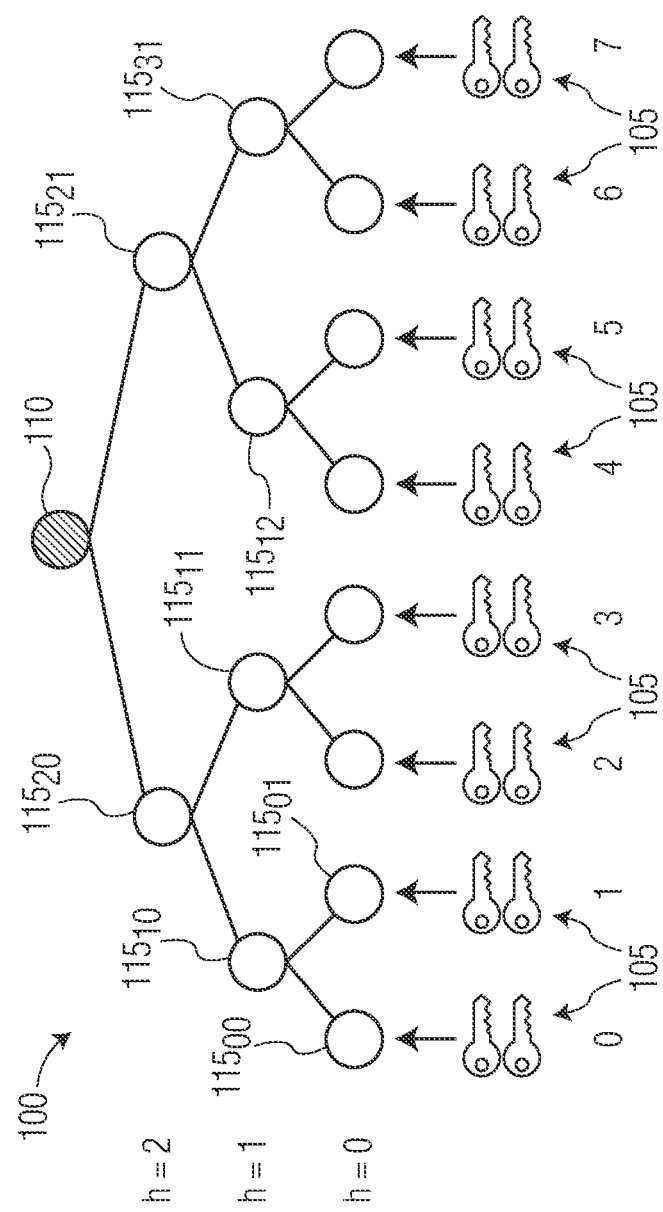
FIG. 2 illustrates a tree corresponding to 8 OTS public-private key pairs.

FIG. 2 illustrates a tree 100 corresponding to 8 OTS public-private key pairs. The tree 100 may be a binary-hash-tree such as a Merkle tree. In a high level description, the nodes $115_{xx}$ of this tree 100 include n-bit hash values. The lowest layer (i.e., for h=0 the leaves of the tree $115_{0x}$) includes the hashed OTS public keys of the OTS keypairs $105_x$. The public key of the Merkle-tree scheme is then the root node 110 of the tree 100, which is constructed by taking pair-wise hashes of tree nodes 105, starting from the leaves, until 1 node remains at height h=3 (the node 110 in FIG. 2).

When signing a message, the signer signs with a (previously unused) OTS keypair 105, and sends the OTS signature of their message, along with the corresponding authentication path to the verifier. This authentication path allows a verifier to verify an OTS signature against the public key of the Merkle-tree-based scheme instead of against the OTS public key.

Figure 3:
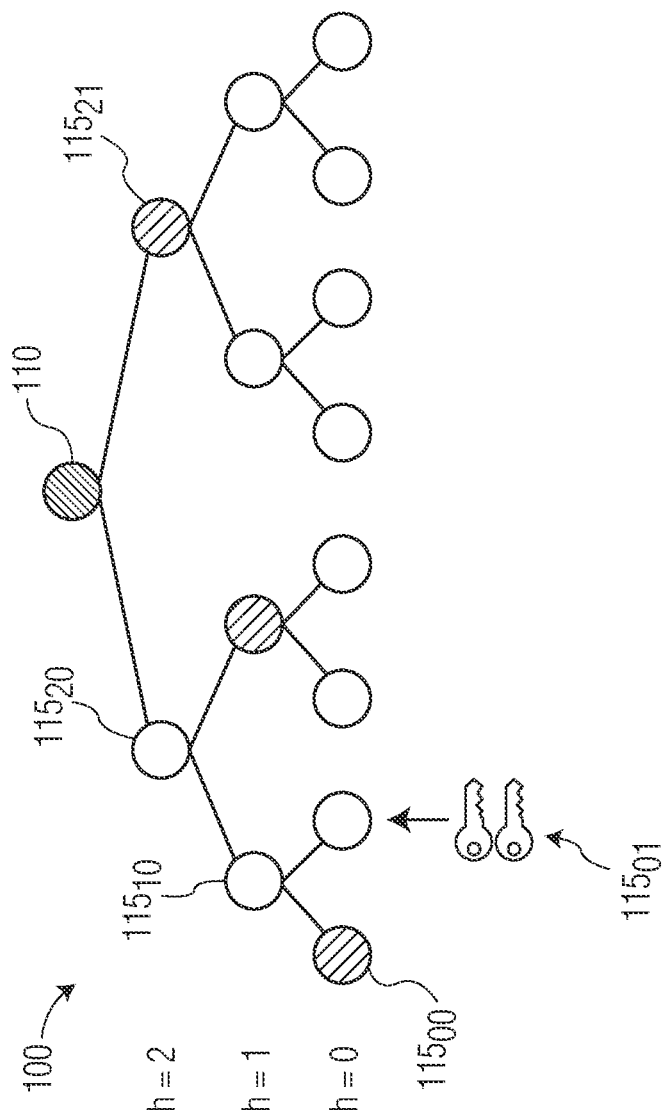
FIG. 3 illustrates an example for the authentication path of the second OTS keypair.

FIG. 3 illustrates an example for the authentication path of the second OTS keypair $1050_1$. The authentication path includes nodes $115_{00}$, $115_{11}$, and $115_{21}$. Given the signature, the verifier may then compute the candidate root key as follows. First, they compute the OTS public key (PK) from the OTS signature and apply a hash to construct the corresponding Merkle tree leaf. Then they can apply in order a pairwise hash with the elements of the provided authentication path including nodes $115_{00}$, $115_{11}$, and $115_{21}$. If the result matched the public key at node 110, the signature is verified.

Given the signature, the verifier can then compute the candidate root key with the provided WOTS+ signature and the authentication path. Strategies for the signer on how and when the authentication path should be computed vary but are not that important for this embodiment. What should be noted is that: 1) the computation of the authentication path involves the computation of WOTS+ public keys, and therefore of WOTS+ chains; and 2) the authentication path can be computed independently from the current WOTS+ signature.

Note that with XMSS, LMS is the second stateful hash-based algorithm that has been standardized. It functions the same as XMSS in the broad lines described here but makes some different low-level design decisions. The embodiments described herein apply to it as well, but for ease of describing the embodiments, XMSS will be used in the description.

XMSS/LMS signing keys have a number of components including the state, the SEED, and auxiliary data. The state is a number that indicates which keys of the Merkle tree have been used (and should therefore not be used again). This is not secret, but very sensitive. If tampered with, it can cause a WOTS+ secret key to be used more than once, leading to a security loss, or to depletion of the keypair. The SEED is the private key from which the secret key components of all the WOTS+ secret keys are derived. The auxiliary data is used to speed up the signing by storing certain nodes of the Merkle tree. These are not private, because they will be part of the signature and are derived from WOTS+ public keys only, but they are sensitive. If they are altered then re-computation can be costly and therefore, they should be integrity protected.

It is noted that different parts of the key require different levels of protection. In this disclosure hardware (HW) protections are used and combined to achieve a more secure hash based signature (HBS) key.

In currently used cryptography, for example, elliptic curve cryptography (ECC)/RSA/advanced encryption standard (AES), keys consist of a bitstring representing a hexadecimal value, or a value in a certain field. This only requires one way to protect the keys and that is in secure memory. LMS and XMSS have a state which is not necessarily private, but very sensitive against rollback, and the auxiliary data, which is not necessarily private and can be rather large to store in secure memory. In addition, the key is often derived from a smaller seed, which can be targeted by a side-channel attacker.

In the embodiments of a secure processing system disclosed herein a processor design is disclosed that utilizes HW features to overcome these issues specific to hash-based signature schemes like LMS and XMSS. This enables a more secure and efficient implementation of such schemes compared to purely software-based (or with only limited HW support for hash computation) ones. The secure processing system includes the following features. A monotonic counter is used to prevent rollback attacks and to protect the state of an LMS/XMSS key. A Leakage Resilient Pseudo Random Number Generator (LR-PRNG) is used in combination with a modified hash accelerator for the secure generation of the WOTS+ secret keys. RTIC (Run time Integrity Check) devices are used to protect the auxiliary data and to check the integrity of the code and hence also protect the hash chains. Hash counters are used to protect the hash chains. These features are combined together in a way that prevents a series of attacks against LMS/XMSS.

Figure 4:
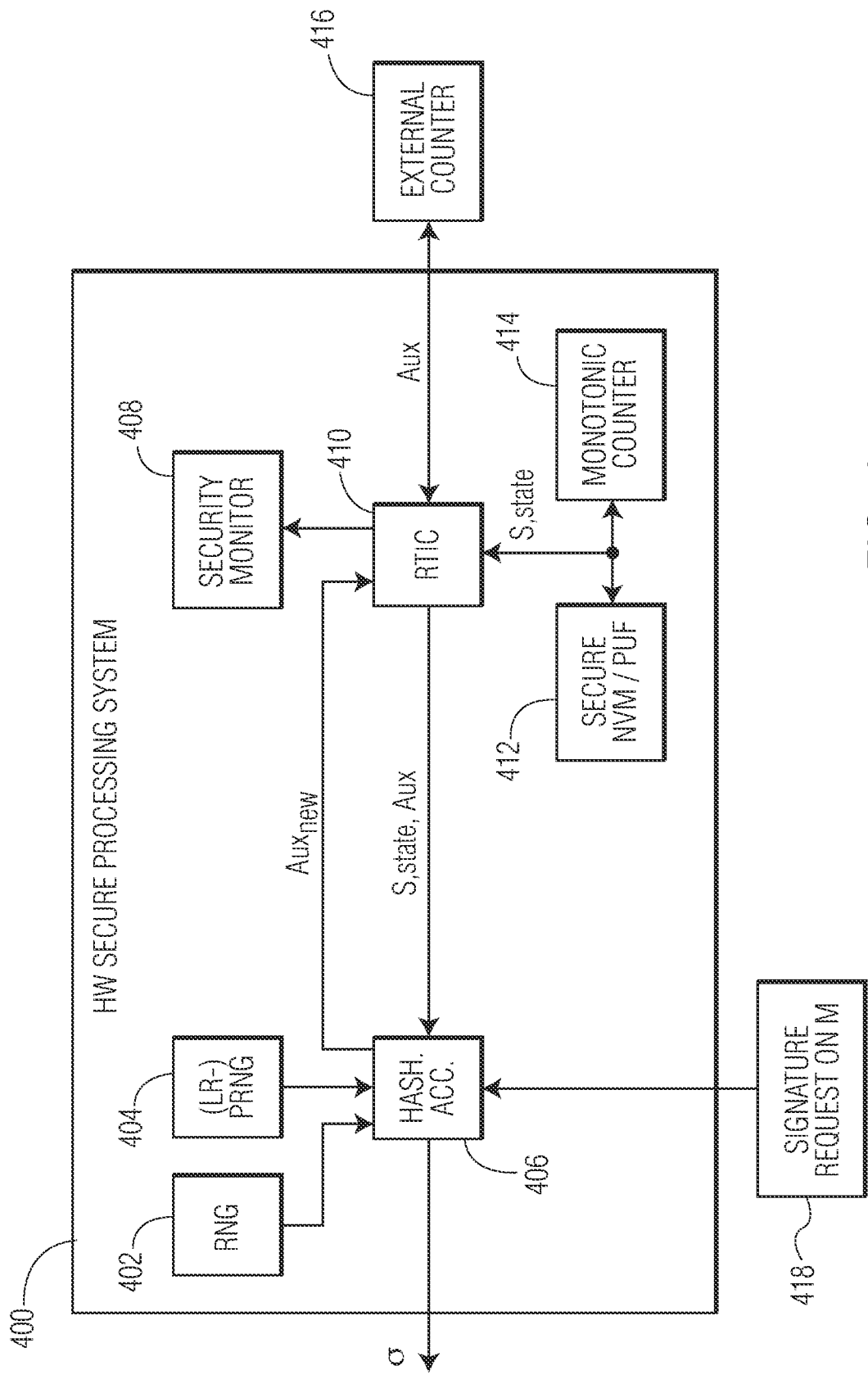
FIG. 4 illustrates a block diagram of an embodiment of a secure processing system.

FIG. 4 illustrates a block diagram of an embodiment of a secure processing system. To simplify the diagram, an abstraction of the CPU, RAM, ROM and other components has been made which are not necessary for the explanation of the secure processing system. The secure processing system 400 includes random number generator (RNG) 402, pseudo-random number generator (PRNG) 404, security monitor 408, RTIC 410, secure non-volatile memory (NVM)/physical unclonable function (PUF) 412, and monotonic counter 414. The secure processing system 400 may be connected to an external memory 416.

The (LR-)PRNG 404 may be instantiated as a basic or leakage-resilient (LR-)PRNG. The PRNG 404 has two potential purposes. First, to provide the randomness for the blinding of the hash accelerator 406 that is required for some leakage-resilient key derivation strategies. Depending on the strategy, the PRNG will generate a pseudo-random sequence of blinding values. To avoid side-channel attacks on the PRNG, it may be instantiated as an LR-PRNG. This increases the overall security of the system but comes with an increased hardware cost for the building block. Second, the PRNG 404 may be directly used to derive the keys for customized key derivation strategies. The embodiments of the secure processing system 400 described herein is independent of the concrete instantiation of this building block. Any (LR-)PRNG solution may be used that fulfills the requirements for hardware cost, quality of randomness and leakage resilience. The PRNG 404 may be implemented solely in hardware to produce random numbers or may be implemented by code running on a processor such as, for example, a MCU or small controller that runs code or is programmable based upon inputs.

The hash accelerator 406 may be implemented as a blinded hash accelerator. To protect the key derivation against a side-channel attacker, the hash accelerator 406 has been modified to enable the efficient use of random blinding values as required for leakage-resilient derivation strategies, e.g., as proposed in U.S. patent application Ser. No. 18/319,982, filed May 18, 2023 entitled "KEY DERIVATION METHODS FOR HASH-BASED SIGNATURE SCHEMES," which is hereby incorporated for all purposes by reference herein in its entirety. In particular, the hash accelerator 406 is modified to receive one additional input value r (random mask) and one blinding enable signal. If this enable signal is set to 0, the hash accelerator works normally. If it is set to 1, the random mask r is combined with public, known input values of each scheme. Note that the logic values for the enable signal may be swapped as well. For LMS:

$SK_{q,i}=H(f(l,r)\|f(q,r)\|f(i,r)\|f(const,r)\|SEED)$.

For XMSS:

$SEED_q=PRF(SEED,toByte(f(q,r),32))$, $SK_{q,i}=PRF(SEED_q,toByte(f(i,r),32))$ for some function $f(\bullet)$, e.g., XOR or modular addition. Note that the function $f$ for each variable does not need to be same. It is also possible to not implement a randomizing function for some public variables to reduce hardware costs. The hash accelerator 406 directly receives the random blinding value from the (LR-)PRNG 404. Therefore this received value may be used in any configuration for the leakage-resilient derivation, e.g., a constant value r for a given seed or a pseudo-random sequence of blinding values.

Figure 5:
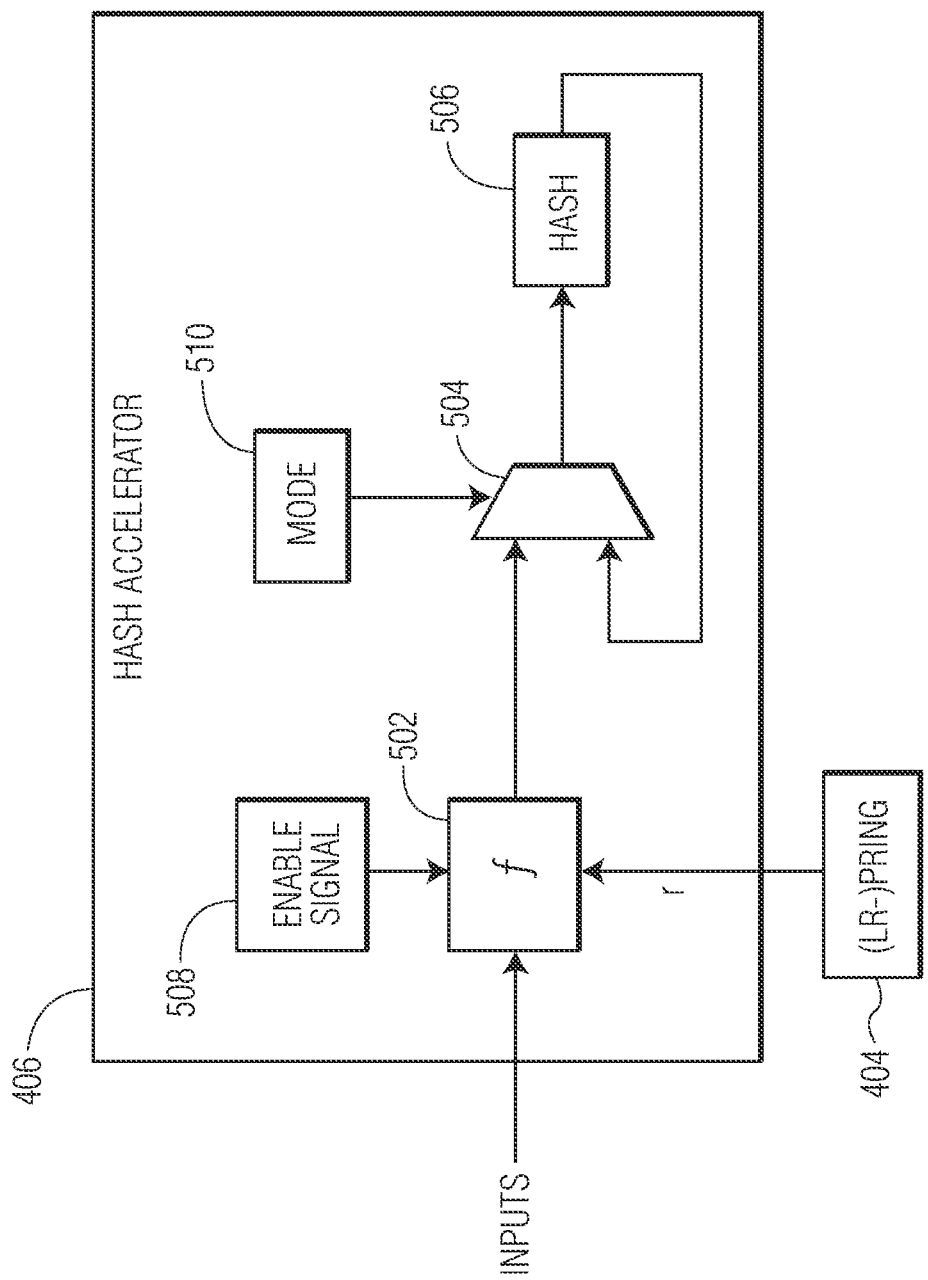
FIG. 5 illustrates a block diagram of the hash accelerator.

Having the function $f$ in hardware instead of computing it explicitly in software brings the benefits of a generally, lower signal-to-noise ratio of the hardware and better performance. FIG. 5 illustrates a block diagram of the hash accelerator 406. The hash accelerator 406 may include function block 502, multiplexer 504, and hash block 506. In the function block 502, the value input is either blinded using the blinding value r (provided by the (LR-)PRNG 404) and a function $f$, or it is passed through unmodified. This may be selected based on the enable signal 508, i.e., if it is not set, the hash accelerator behaves the same as an unblinded version. The potentially blinded input is then multiplexed using the mode signal 510 that selects between fresh potentially-blinded input and chaining the output of hash block 506. The function block 502 and the hash block 506 may be implemented solely in hardware to carry out the function or the hash, respectively, or may be implemented by code running on a processor such as, for example, a MCU or small controller that runs code or is programmable based upon inputs.

Another attack path on implementations of HBS is the skipping of hashes. To protect against this, it is proposed that the hash accelerator 406 implements a dedicated hash counter in hardware. At its first call, the hash accelerator 406 receives the number of hashes that it has to perform in sequence (e.g., to compute the signature in WOTS+). The hash accelerator 406 keeps track of the number of hashes it has performed for each hash chain thanks to a counter and compares it to the number of hashes it was supposed to perform to ensure that no hash calls were skipped. If the hash counter does not match the initial number of in-sequence hashes requested, the output value is not returned.

In addition, the hash accelerator 406 would also keep track of the total number of hashes performed over a whole signature request. This number is also tracked by the CPU that makes the call to the secure processing system 400. A signature is returned only if the two numbers are equal. Hash counting is a countermeasure performed to detect fault attacks and can be done for a WOTS+ chain, the entire signature algorithm, or a level in between. The choice of granularity is up to the implementer, but this hash block is usable for each level.

The monotonic counter 414 is a device that is usually used for rollback protection e.g., to prevent replay attacks in security protocols or restrict the use of a resource. The state of LMS/XMSS is sensitive to rollback attacks or to a fault keeping it constant, because reusing the same WOTS+ key degrades the security of the scheme. Two different types of monotonic counters may be used in the secure processing system 400. The first type has only one API, which enables the retrieval of the current counter value. For each call to the API, the counter automatically increments itself. Therefore, it is not possible to read out the counter value without incrementing. This provides the strongest security properties, as each counter state is guaranteed to be only read once. The second type has two different APIs. As before, it is possible to read the counter value, but this time the monotonic counter does not increment automatically. For this functionality, there is a separate API that needs to be called. While this provides less robustness than the first approach, it offers a bit more usage flexibility. Any implementation of a monotonic counter may be used. The monotonic counter 414 may be implemented solely in hardware or may be implemented by code running on a processor such as, for example, a MCU or small controller that runs code or is programmable based upon inputs.

The auxiliary data is updated at each signature. Every secret WOTS+ key and hence state corresponds to a particular auxiliary data. The protection of the auxiliary data is important because it is quite expensive (in performance) to recompute and allowing an adversary to repeatedly fault the auxiliary data may cause a denial of service (DoS). The RTIC device 410 is used to protect the integrity of the auxiliary data, and this is achieved by updating and storing the auxiliary data and its hash. When a new signature is requested and the auxiliary data is loaded, it is hashed again and its new hash is compared to the previously stored hash. If the two hashes differ then the RTIC 410 will raise a flag. Otherwise, the auxiliary data is updated and hashed, and then the data and its hash are stored for the next signature call. It is also possible to hash the auxiliary data along with the state in order to bind them through the hash used by the RTIC 410. A similar device may be used to protect the integrity of the running code, e.g., to ensure that no hashes are skipped through a fault in the code. Any implementation of an RTIC 410 may be used. The RTIC 410 may be implemented solely in hardware to carry out the integrity check or may be implemented by code running on a processor such as, for example, a MCU or small controller that runs code or is programmable based upon inputs.

The secure NVM/PUF 412 may include a secure NVM and a secure PUF. These are functions that are implemented in hardware. The LMS/XMSS SEED is sensitive private data that needs to be protected. It may be directly provisioned into the secure NVM at manufacturing, or later generated by an (LR-)(P)RNG and stored there on-chip. Alternatively, the SEED can also be generated by a PUF. A PUF generates random data/keys in a reproducible manner that is bound to the chip; executing the same PUF on another device will not generate the same random data. Binding the SEED to the chip is especially desirable for stateful hash-based algorithms; it is mandated by the NIST standard that the SEED is not exportable. If it were exported, the risk of state re-use (accidentally or maliciously) increases. By having the SEED generated by the PUF, the secure processing system 400 prevents exporting the key and thereby increases the security. Ideally all WOTS+ keys would be derived from the PUF, instead of only the SEED. However this is often not feasible because of the PUFs construction; each key requires a challenge of some sort and the sheer quantity of WOTS+ keys would make this impractical.

The security monitor 408 is a chip feature that may monitor the chip by taking flags and indicators from other HW/SW blocks and then taking action when these flags and indicators exhibit abnormalities. For instance temperature, voltage, or other sensors may indicate glitches to the security monitor 408, but also hardware performance counters may be input to the security monitor 408. It is noted that when an anomaly is flagged during an LMS/XMSS signing by the secure processing system 400, this may serve as input to a security monitor 408 as well. The security monitor 408 may be implemented solely in hardware 400 or may be implemented by code running on a processor such as, for example, a MCU or small controller that runs code or is programmable based upon inputs.

Because the auxiliary data is rather large, in many cases the size of the secure NVM can be too limited to store the auxiliary data. In this case the external memory 416 is useful to store such large data. Although the auxiliary data is not sensitive, storing the auxiliary data in less-secure memory regions makes it susceptible to tampering. If the auxiliary data is compromised and not detected, many future signatures may become invalid. Therefore the RTIC device 410 is vital to protect it.

The RNG 402 may be used to generate randomness if masking or more generally side-channel countermeasures are required. The RNG 402 may also be used to generate the seeds if key generation is performed on the same device. This can alternatively also be performed by a true RNG (TRNG). The RNG 402 may be implemented solely in hardware to produce random numbers or may be implemented by code running on a processor such as, for example, a MCU or small controller that runs code or is programmable based upon inputs.

Figure 6:
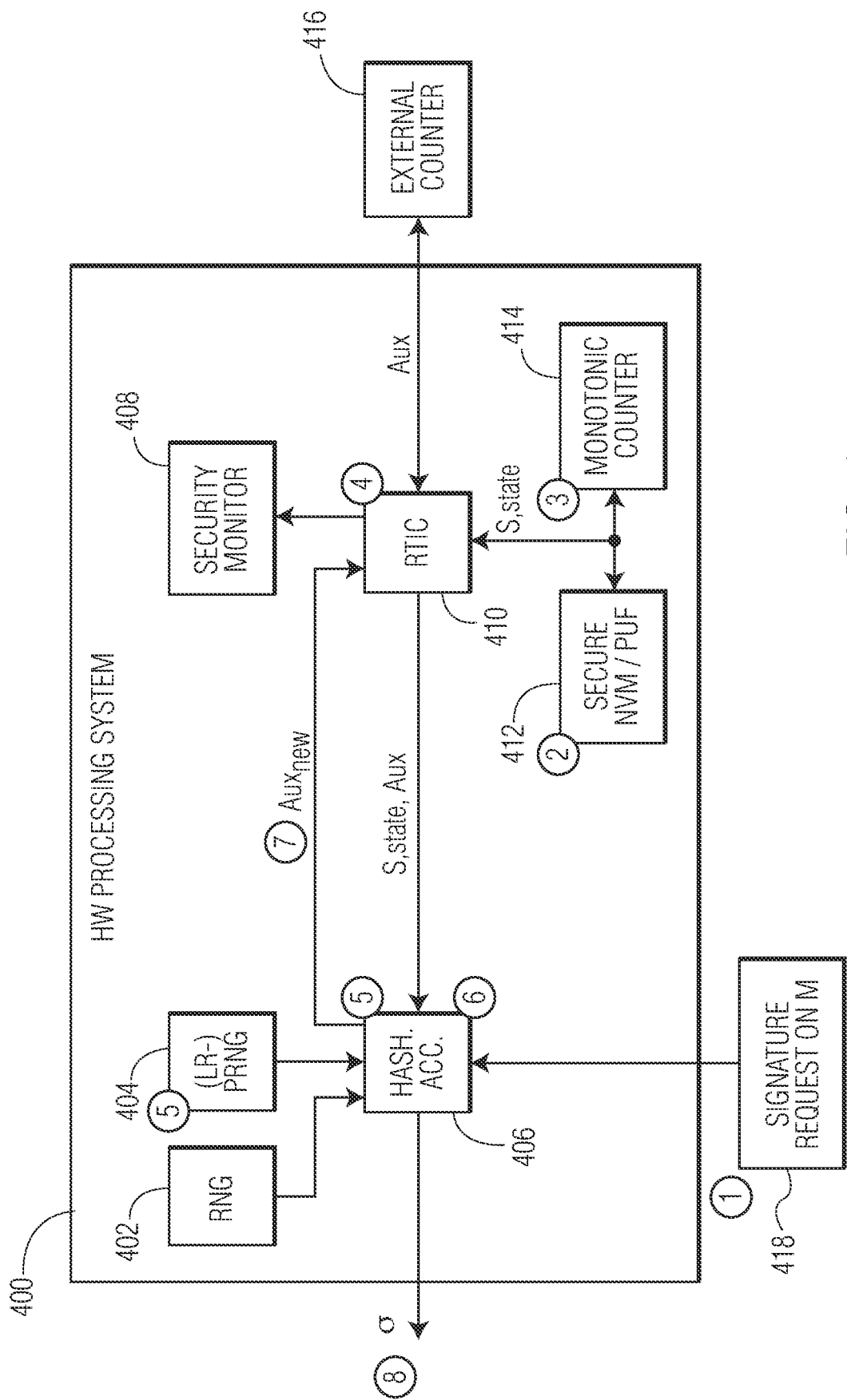
FIG. 6 illustrates a usage flow of the secure processing system using 8 steps.

FIG. 6 illustrates a usage flow of the secure processing system 400 using 8 steps. Each of the 8 steps is indicated by a step number in FIG. 6. FIG. 6 illustrates the use case where the secure processing system 400 is functioning correctly, and no attacks are being performed on the secure processing system 400. When the secure processing system 400 is not under the attack of a malicious actor, the components of the secure processing system 400 should work together in the following flow.

In step 1 a signature request 418 comes in from the non-secure area (e.g. the microcontroller (MCU)) on a message M. This may include a descriptor of a specific key to sign with.

In step 2, the secret key seed S is loaded from secure NVM to the secure RAM in the secure sub-system. As described above, this may be bound to the device by loading it from a PUF instead.

In step 3 the state counter of S is loaded from the monotonic counter state to the secure RAM. Alternatively this state may also be stored in NVM and should then be checked against the monotonic counter for correctness. After checking/loading the state, the monotonic counter should be incremented. This can optionally be done only when the signature is released to the non-secure area (Step 8), however doing it immediately may be more fool-proof.

In step 4, the auxiliary data Aux is retrieved by the RTIC 410 from the external memory 416 that consists of the auxiliary information necessary to compute the (next) authentication path. To verify its integrity, the auxiliary data Aux may for instance be checked to verify that Hash(Aux, state) is equal to a hash value stored in NVM (or some other RTIC 410 system may be used).

In step 5 the key derivation takes place. Here the seed S is combined with the state to derive the WOTS+ keys corresponding to the state, i.e., $S_{state}$. Alternatively, a blinding value (generated by an LR-PRNG) can be used to hide the used indices as described above while deriving the key.

In step 6 the actual LMS/XMSS signing algorithm takes place. This includes keeping track of the number of hashes performed to thwart hash skipping faults. As part of step 6, Aux is updated for the next signature.

In step 7, this new auxiliary value is hashed, and its hash value stored in the NVM for the next signature (or any other RTIC 410 system). The auxiliary data Aux is then written to external memory 416. The current value of the state is also stored in NVM for comparison to the monotonic counter at the next signature.

If all steps are completed without warnings or flags, the signature σ may be output.

It will now be shown how the secure processing system 400 protects against common attack on hash-based signature schemes.

For a fault attack on the state, it is assumed that an attacker cannot decrement or keep the monotonic counter constant. What is possible is to skip the loading of its value to secure RAM, however that attack may be avoided by initializing the value to an invalid state in secure RAM e.g., −1 such that without loading a value from the monotonic counter, an invalid signature will always be created. An attacker can also fault the value of the state variable in secure RAM, for instance by setting it to 0 or to a constant value, however then the authentication path will not match the state and an invalid signature is created. This would be detected by a third party trying to authenticate the signature.

A fault attack on the auxiliary data may be attempted by an attacker. Because a hash of the auxiliary data is stored, the RTIC device 410 may check whether the stored hash is equal to a new hash of the auxiliary data to make sure that it has not been faulted. The RTIC 410 will then indicate that a fault has been detected.

A fault attack on the hash chains may be attempted by an attacker. The actual number of hashes performed in sequence is kept track of using a counter. This value is then compared to the initial number of hashes requested. This ensures that no hash calls were skipped. If the values do not match then a fault may be indicated.

A side channel attack (SCA) may be performed on the key derivation by an attacker. The key derivation process of HBS is sensitive to SCA because the same seed is potentially hashed numerous times with varying inputs. In addition, to performing the key derivation in HW, which increases the side-channel noise, to improve the SCA resistance of the key derivation, the randomization or the blinding of the known inputs to the hash calls may be enabled as described above. Hence, the seed is now hashed with inputs that are unknown to an attacker, making powerful attacks such as differential power analysis (DPA) impractical.

An attacker may attempt to export keys from the NVM. Some physical attacks include taking the data on a secure subsystem and plugging it into another device in order to derive secrets there. However, depending on the exact attack, the PUF will not give the same result on another device and therefore the keys are not obtained.

Tampering may be detected by the security monitor 408 when an attacker attacks the secure processing system 400. Whenever the security monitor 408 flags a tampering event, and a signature is under construction by the secure processing system 400, some action would need to be taken. The most straightforward approach would be to invalidate the current signature, make sure the state is upped once more, and invalidate the auxiliary data. This does result in a lot of overhead for the next signature computation, but this is often not important for a system under attack.

Figure 7:
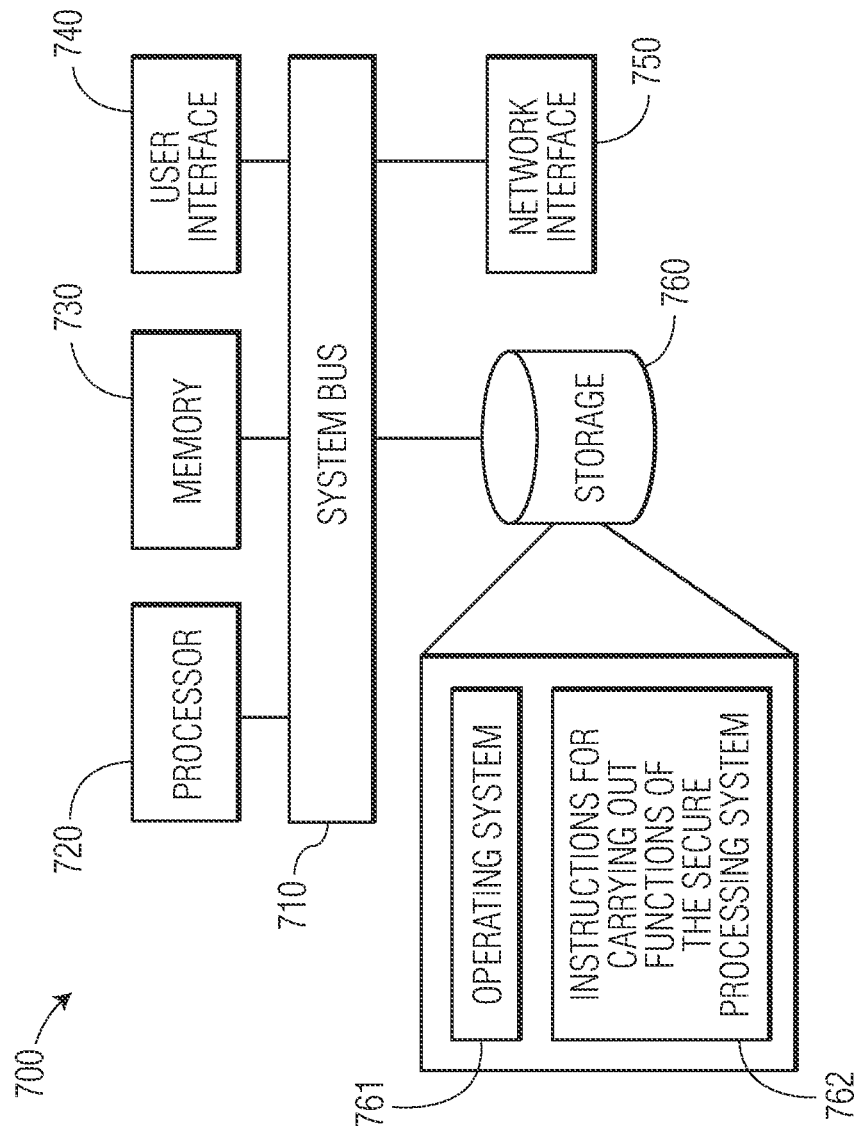
FIG. 7 illustrates an exemplary hardware diagram that may be used for implementing various parts of the secure processing system.

FIG. 7 illustrates an exemplary hardware diagram 700 that may be used for implementing various parts of the secure processing system 400. The exemplary hardware 700 (or a simplified version thereof) may correspond to the RNG 402, PRNG 404, hash accelerator 406, security monitor 408, RTIC 410, or monotonic counter 414. As shown, the device 700 includes a processor 720, memory 730, user interface 740, network interface 750, and storage 760 interconnected via one or more system buses 710. It will be understood that FIG. 7 constitutes, in some respects, an abstraction and that the actual organization of the components of the device 700 may be more complex than illustrated.

The processor 720 may be any hardware device capable of executing instructions stored in memory 730 or storage 760 or otherwise processing data. As such, the processor may include a microprocessor, microcontroller, graphics processing unit (GPU), neural network processor, field programmable gate array (FPGA), application-specific integrated circuit (ASIC), or other similar devices. The processor may be a secure processor or include a secure processing portion or core that resists tampering.

The memory 730 may include various memories such as, for example L1, L2, or L3 cache or system memory. As such, the memory 730 may include static random-access memory (SRAM), dynamic RAM (DRAM), flash memory, read only memory (ROM), or other similar memory devices. Further, some portion or all of the memory may be secure memory with limited authorized access and that is tamper resistant.

The user interface 740 may include one or more devices for enabling communication with a user such as an administrator. For example, the user interface 740 may include a display, a touch interface, a mouse, and/or a keyboard for receiving user commands. In some embodiments, the user interface 740 may include a command line interface or graphical user interface that may be presented to a remote terminal via the network interface 750.

The network interface 750 may include one or more devices for enabling communication with other hardware devices. For example, the network interface 750 may include a network interface card (NIC) configured to communicate according to the Ethernet protocol or other communications protocols, including wireless protocols. Additionally, the network interface 750 may implement a TCP/IP stack for communication according to the TCP/IP protocols. Various alternative or additional hardware or configurations for the network interface 750 will be apparent.

The storage 760 may include one or more machine-readable storage media such as read-only memory (ROM), random-access memory (RAM), magnetic disk storage media, optical storage media, flash-memory devices, or similar storage media. In various embodiments, the storage 760 may store instructions for execution by the processor 720 or data upon with the processor 720 may operate. For example, the storage 760 may store a base operating system 761 for controlling various basic operations of the hardware 700. Storage 762 may include instructions for carrying out some of the functions of the secure processing system 400.

It will be apparent that various information described as stored in the storage 760 may be additionally or alternatively stored in the memory 730. In this respect, the memory 730 may also be considered to constitute a "storage device" and the storage 760 may be considered a "memory." Various other arrangements will be apparent. Further, the memory 730 and storage 760 may both be considered to be "non-transitory machine-readable media." As used herein, the term "non-transitory" will be understood to exclude transitory signals but to include all forms of storage, including both volatile and non-volatile memories.

The system bus 710 allows communication between the processor 720, memory 730, user interface 740, storage 760, and network interface 750.

While the host device 700 is shown as including one of each described component, the various components may be duplicated in various embodiments. For example, the processor 720 may include multiple microprocessors that are configured to independently execute the methods described herein or are configured to perform steps or subroutines of the methods described herein such that the multiple processors cooperate to achieve the functionality described herein.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, the term "non-transitory machine-readable storage medium" will be understood to exclude a transitory propagation signal but to include all forms of volatile and non-volatile memory. When software is implemented on a processor, the combination of software and processor becomes a specific dedicated machine.

Because the data processing implementing the embodiments described herein is, for the most part, composed of electronic components and circuits known to those skilled in the art, circuit details will not be explained in any greater extent than that considered necessary as illustrated above, for the understanding and appreciation of the underlying concepts of the aspects described herein and in order not to obfuscate or distract from the teachings of the aspects described herein.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A secure processing system configured to perform a hash based digital signature of a message, comprising:
    random number generator (RNG);
    a monotonic counter device configured to produce a counter value that is monotonically increasing to prevent rollback;
    a hash accelerator configured to produce a hash of the message based upon a random number from the RNG, to determine a number of hashes to produce the hash of the message, and to maintain a hash count of hash operations performed to produce the hash of the message, the hash accelerator configured to compare the number of hashes to the hash count and to output the hash based digital signature when the number of hashes matches the hash count; and
    a run time integrity check (RTIC) device configured to check an integrity of an operation of the hash accelerator based upon the counter value.

2. The secure processing system of claim 1, wherein the RNG is a pseudo-random RNG.

3. The secure processing system of claim 1, wherein the RNG is a leakage resistant pseudo-random RNG.

4. The secure processing system of claim 1, further comprising a security monitor configured to monitor the secure processing system based upon outputs from the RTIC device.

5. The secure processing system of claim 1, further comprising a secure non-volatile memory (NVM) configured to store a private seed.

6. The secure processing system of claim 5, further comprising a physical unclonable function (PUF) configured to produce the private seed that is unique to the secure processing system.

7. The secure processing system of claim 5, wherein the NVM stores auxiliary data used to compute an authentication path.

8. The secure processing system of claim 5, wherein the NVM stores a hash of auxiliary data used to verify the integrity of an authentication path.

9. The secure processing system of claim 5, wherein the NVM stores a hash of auxiliary data used to verify the integrity of an authentication path and the counter value.

10. The secure processing system of claim 5, wherein the RTIC device is configured to:
    store auxiliary data used to compute an authentication path in an external memory,
    store a hash of the auxiliary data in the NVM,
    retrieve the auxiliary data from the external memory,
    hash the auxiliary data from the external memory, and
    compare the hash of the auxiliary data from the external memory to the hash of the auxiliary data stored in the NVM.

11. The secure processing system of claim 1, wherein the hash accelerator is configured to maintain a hash counter value and the RTIC is configured to check the integrity of an operation of the hash accelerator based upon the hash counter value.

12. The secure processing system of claim 1, wherein the hash accelerator is configured to receive a random mask and to apply the random mask to public input values to the hash accelerator.

13. The secure processing system of claim 12, wherein the hash accelerator is configured to receive an enable signal indicating whether the random mask is to be applied to the public input values to the hash accelerator.

14. The secure processing system of claim 1, wherein the monotonic counter device is configured to update the counter value each time the counter value is read from the monotonic counter device.

15. A secure processing system configured to perform a hash based digital signature of a message, the secure processing system comprising:
random number generator (RNG);
a monotonic counter device configured to produce a counter value that is monotonically increasing;
a hash accelerator configured to receive to receive a signature request for the message and to produce a hash of the message based upon a random number from the RNG and the counter value, the hash accelerator to determine a number of hashes to complete the signature request and, upon completion of the signature request, to compare the number to a count of hashes performed to determine whether the number of hashes matches the count of hashes, when the number of hashes differs from the count of matches, the hash accelerator does not provide the hash of the message; and
a run time integrity check (RTIC) device configured to check an integrity of an operation of the hash accelerator based upon the counter value.

16. The secure processing system of claim 15, further comprising a security monitor configured to monitor the secure processing system based upon outputs from the RTIC device.

17. The secure processing system of claim 15, further comprising a secure non-volatile memory (NVM) configured to store a private seed.

18. The secure processing system of claim 17, further comprising a physical unclonable function (PUF) configured to produce the private seed that is unique to the secure processing system.

19. The secure processing system of claim 17, wherein the NVM stores auxiliary data used to compute an authentication path.

20. The secure processing system of claim 17, wherein the NVM stores a hash of auxiliary data used to verify the integrity of at least one of an authentication path and the counter value.

21. The secure processing system of claim 17, wherein the RTIC device is configured to:
store auxiliary data used to compute an authentication path in an external memory,
store a hash of the auxiliary data in the NVM,
retrieve the auxiliary data from the external memory,
hash the auxiliary data from the external memory, and
compare the hash of the auxiliary data from the external memory to the hash of the auxiliary data stored in the NVM.

22. The secure processing system of claim 15, wherein the hash accelerator is configured to maintain a hash counter value and the RTIC is configured to check the integrity of an operation of the hash accelerator based upon the hash counter value.

* * * * *